R. D. CHRISTMAN.
GANG-PLOW.
No. 184,838.
Patented Nov. 28, 1876.
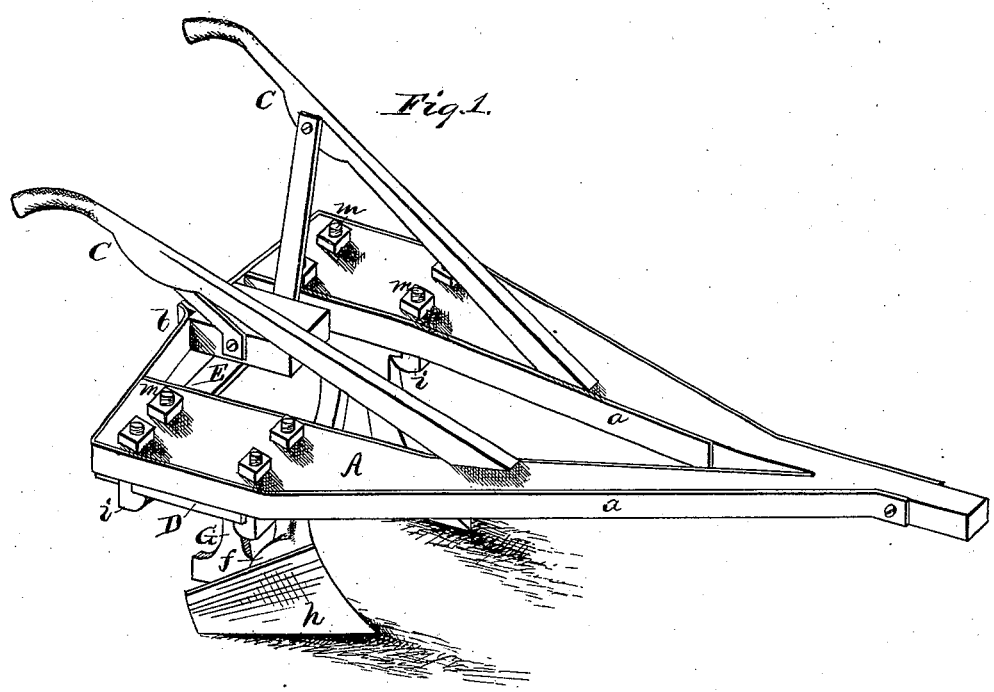
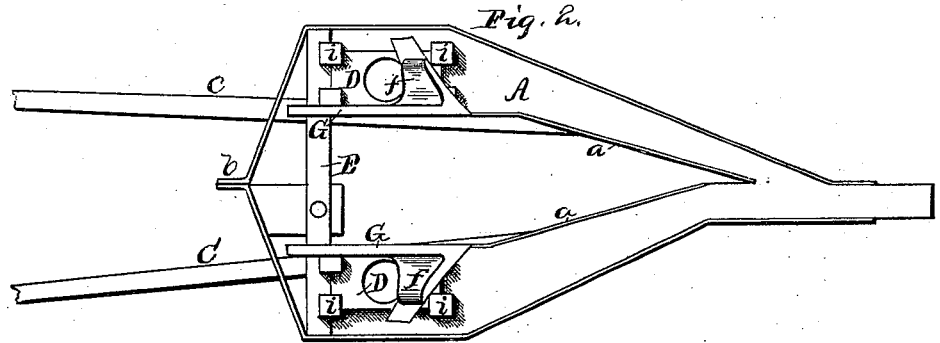
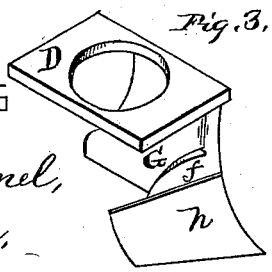
WITNESSES
Jas. F. Duhamel,
Thomas Byrne,
INVENTOR
R. D. Christman
PER
H. S. Abbot.
ATTORNEY

UNITED STATES PATENT OFFICE.

ROBERT D. CHRISTMAN, OF JOHNSTON COUNTY, NORTH CAROLINA.

IMPROVEMENT IN GANG-PLOWS.

Specification forming part of Letters Patent No. 184,838, dated November 28, 1876; application filed July 22, 1875.

*To all whom it may concern:*

Be it known that I, ROBERT D. CHRISTMAN, of the county of Johnston and State of North Carolina, have invented certain new and useful Improvements in Gang-Plows, of which the following is a specification:

The nature of my invention consists in the construction and arrangement of a gang-plow, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a perspective view of my gang-plow. Fig. 2 is a bottom view of the frame. Fig. 3 is a detached view of one of the plows, showing also one of the bolts with which it is fastened.

A represents the frame, made of wood, substantially in the form shown in Fig. 2, and lined both on the outside and inside with sheet-iron strips $a$ $a$, which are united together at the rear end, forming a brace, $b$. C C are the handles, connected to the frame in any suitable manner. On the under side of the frame A, near the rear end, is secured a metallic cross-bar, E.

The plows are constructed in the following manner: D is a rectangular plate of any suitable dimensions, cast with a frame, G, or stirrup, along one side, the plate and frame or stirrup standing at right angles with each other. The frame or stirrup G is of suitable form to receive a land-side, $d$, along its lower edge, and has a curved wing, $f$, cast with it for the attachment of the plow-point $h$. These plows are held to the under side of the frame A by means of four bolts, $m$ $m$, having enlarged heads $i$ $i$, projecting inward over the edges of the plate, so that the plate can be moved laterally to bring the plows at any desired distance apart, and are then fastened by nuts $n$ on the upper ends of the bolts.

The rear bolts for each plow pass through notches in the under cross-bar E, so that the plate D will bear against the same. The plows may be reversed at will, so as to throw the earth to or from the rows, as desired.

Having thus fully described my invention, what I claim as new, and desire to secure by Letters Patent, is—

In combination with the frame A or similar frame, the bolts $m$, the plate D, with the frame or stirrup G, made with the land-side in one piece, or adapted to receive a land-side in a separate piece, and with wing $f$ for the attachment of the point $h$, all constructed and arranged substantially as shown and described.

In testimony that I claim the foregoing as my invention I hereunto affix my signature this 15th day of July, 1875.

R. D. CHRISTMAN.

Witnesses:
 S. B. HINNANT,
 G. W. BISHOP.